United States Patent
Hale

[11] Patent Number: 6,065,898
[45] Date of Patent: *May 23, 2000

[54] THREE TOOTH KINEMATIC COUPLING

[75] Inventor: Layton C. Hale, Livermore, Calif.

[73] Assignee: The Regents of the University of California, Oakland, Calif.

[*] Notice: Under 35 U.S.C. 154(b), the term of this patent shall be extended for 634 days.

[21] Appl. No.: 08/511,980

[22] Filed: Aug. 7, 1995

[51] Int. Cl.[7] .................................................... F16D 1/00
[52] U.S. Cl. ......................... 403/364; 403/190; 403/340; 403/381; 464/157; 192/69.83
[58] Field of Search .................. 403/190, 291, 403/364, 311, 340, 381; 192/114 T, 69.81, 69.82, 69.83; 464/149, 157

[56] References Cited

U.S. PATENT DOCUMENTS

| | | | |
|---|---|---|---|
| 1,241,118 | 9/1917 | Hoskins | 464/157 |
| 1,260,690 | 3/1918 | Liady | 403/364 X |
| 1,739,756 | 12/1929 | Granville | 464/149 |
| 2,094,416 | 9/1937 | Sheffield | 403/364 X |
| 2,384,583 | 9/1945 | Wildhaber | 192/69.83 |
| 2,388,456 | 11/1945 | Wildhaber | 464/157 X |
| 2,398,570 | 4/1946 | Wildhaber | 403/364 X |
| 2,551,735 | 5/1951 | Goff | 464/149 |
| 2,654,456 | 10/1953 | Wildhaber | 192/69.83 X |
| 4,074,946 | 2/1978 | Swearingen | 403/364 |
| 4,307,795 | 12/1981 | Roy | 192/69.82 |
| 5,730,657 | 3/1998 | Olgren | 464/157 |

FOREIGN PATENT DOCUMENTS

| | | | |
|---|---|---|---|
| 850296 | 12/1939 | France | 403/364 |
| 14963 | 7/1969 | Japan | 464/157 |
| 578287 | 6/1946 | United Kingdom | 464/157 |

OTHER PUBLICATIONS

A. Slocum, Precision Machine Design, Prentice Hall, 1992, pp. 401–402.
D.L. Blanding, Principles of Exact Constraint Mechanical Design, Eastman Kodak Co., 1992, pp. 28–29.
Machinery handbook, 24th Edition, Couplings and Clutches, Industrial Press, 1992, pp. 2237–2239.

*Primary Examiner*—Daniel P. Stodola
*Assistant Examiner*—Bruce A. Lev
*Attorney, Agent, or Firm*—Alan H. Thompson; L. E. Carnahan

[57] ABSTRACT

A three tooth kinematic coupling based on having three theoretical line contacts formed by mating teeth rather than six theoretical point contacts. The geometry requires one coupling half to have curved teeth and the other coupling half to have flat teeth. Each coupling half has a relieved center portion which does not effect the kinematics, but in the limit as the face width approaches zero, three line contacts become six point contacts. As a result of having line contact, a three tooth coupling has greater load capacity and stiffness. The kinematic coupling has application for use in precision fixturing for tools or workpieces, and as a registration device for a work or tool changer or for optics in various products.

15 Claims, 2 Drawing Sheets

THREE TOOTH KINEMATIC COUPLING

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention is directed to kinematic couplings, particularly to such couplings having surfaces to exactly constrain the six degrees of freedom of a rigid body, and more particularly to a three tooth kinematic coupling having three line contracts which increases the area of contact, reduces localized stress, and increases stiffness and load capacity.

Kinematic couplings have long been known to provide an economical and dependable method for attaining high repeatability in fixtures. Properly designed kinematic couplings are deterministic: they only make contact at a number of points equal to the number of degrees of freedom that are to be restrained. Being deterministic makes performance predictable and also helps to reduce design and manufacturing costs. On the other hand, contact stresses in kinematic couplings are often very high and no elastrohydrodynamic lubrication layer exists between the elements that are in point contact; thus for high-cycle applications, it is advantageous to have the contact surfaces made from corrosion-resistant materials (e.g., ceramics). When non-stainless steel components are used, one must wary of fretting at the contact interfaces, so steel couplings should only be used for low-cycle applications.

Submicron repeatability is common because a kinematic coupling provides the minimum number of contact surfaces required to exactly constrain the six degrees of freedom of a rigid body. Analytically, a kinematic coupling is statically determinant except for a small uncertainty regarding friction between the contacting surfaces.

Previously, there existed two general types of kinematic couplings. Each type uses three spheres or balls attached to one part which come to rest on six surfaces on the mating part. This gives nearly ideal kinematics at the price of very high localized stresses. The first of these two types of kinematic couplings is commonly called a Kelvin Clamp. In this coupling, the three balls rest respectively in a tetrahedral socket, a vee-groove aligned to the socket, and a flat plane. The load capability of the Kelvin Clamp is almost always limited by high stress at the interface between the ball and the flat. The second type of kinematic coupling differs by having three vee-grooves to receive the three balls. The grooves usually, but not necessarily, align to a point between them. When the grooves are manufactured as a gothic arch to increase the actual area of contact, the stiffness and load capacity of the three-ball-and-vee coupling are greatly improved over those of the Kelvin Clamp. These prior known kinematic couplings are exemplified in A. Slocum, Precision Machine Design, Prentice Hall, 1992, pp. 401–402; and D. L. Blanding, Principles of Exact Constraint Mechanical Design, Eastman Kodak Co., 1992, pp. 28–29.

The kinematic coupling of the present invention differs from the above-described prior approaches in that it utilizes a three tooth arrangement based on having three theoretical line contacts formed by mating teeth rather than six theoretical point contacts. One could consider six points arranged in pairs to define three lines of contact, but this fact has not been previously used to increase the actual area of contact and thus increase the coupling's stiffness and load capacity. Tooth type couplings, often referred to as positive clutches, are known as exemplified by Machinery Handbook, 24th Edition, Couplings and Clutches, Industrial Press, 1992, pp. 2237–2239. However, these prior teeth type couplings require more than three teeth. Also, another previous tooth type coupling, e.g., Hirth couplings, exemplified in (citation showing a Hirth coupling), have not been kinematic because their primary application has been angular indexing that generally requires more than three teeth. A Hirth coupling with only three teeth would be semi-kinematic but still would require highly precise and specialized machine tools to manufacture the mating tooth profiles. The three tooth kinematic coupling is also semi-kinematic but its tooth form allows an extra degree of freedom that greatly simplifies manufacture. The machine tool needs only to have precise straight line motion to produce teeth that mate properly.

SUMMARY OF THE INVENTION

It is an object of the present invention to provide an improved kinematic coupling which increases the actual area of contact, reduces localized stress points, and increases stiffness and load capacity.

A further object of the invention is to provide a kinematic coupling based on having three theoretical line contacts formed by mating teeth rather than six theoretical point contacts.

A further object of the invention is to provide a three tooth kinematic coupling, which increases stiffness and load capacity.

Another object of the invention is to provide a three tooth kinematic coupling having three lines of contact to increase the actual area of contact and increase the coupling's stiffness and load capacity.

Another object of the invention is to provide a three tooth kinematic coupling which the two halves of the coupling have the same or different tooth configurations.

Another object of the invention is to provide a three tooth kinematic coupling having a geometry that requires one coupling half to have curved or cylindrical teeth and the other to have flat teeth or cylindrical or curved teeth on both halves.

Other objects and advantages of the present invention will become apparent from the following description and accompanying drawings. The invention involves a three tooth kinematic coupling that is based on having three theoretical line contacts formed by mating teeth rather than six theoretical point contacts as in the prior three-ball type couplings. One could consider six points arranged in pairs to define three lines of contact, but this fact was not previously used to increase the actual area of contact and thus increase the coupling's stiffness and load capacity. The kinematic coupling of this invention has a geometry that requires one coupling half to have curved teeth and the other half to have flat teeth. The kinematic coupling of this invention has wide use applications, such as in precision fixturing for tools or workpieces, such as on diamond turning and coordinate measuring machines, registration devices for a work changer or tool changer on a computer controlled machine tool, and registration device for optics of various types.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves a kinematic coupling which is often used in precision machines and instruments to provide repeatable location of a part that requires periodic removal, or uncoupling. Submicron repeatability is common because a kinematic coupling provides the minimum number of contact surfaces required to exactly constrain six degrees of freedom of a rigid body. The prior known kinematic couplings utilized spheres or balls to form six point contacts which produced ideal kinematics but at the price of very high localized stresses. The three tooth kinematic coupling of this invention is based on having three theoretical line contacts formed by mating teeth rather than six theoretical point contacts, thereby increasing the actual area of contact, reducing the localized stress, and increasing the couplings stiffness and load capacity. The geometry of a preferred embodiment requires one coupling half to have curved teeth and the other half to have flat teeth.

Figure 1:
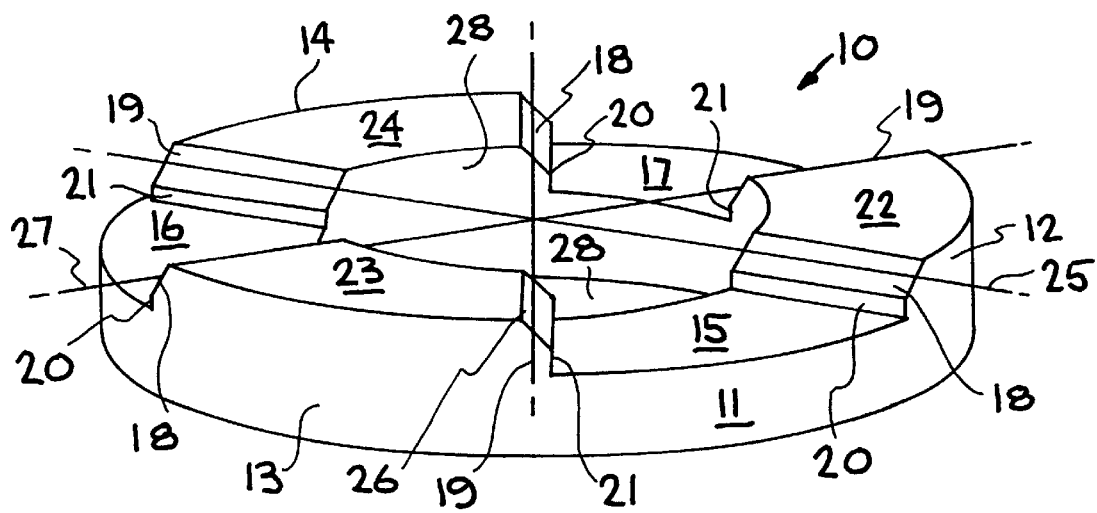
FIG. 1 illustrates a lower half of an embodiment of a three tooth kinematic coupling which illustrates the three line contacts in accordance with the present invention.

The three tooth coupling of the present invention has fundamentally different kinematics than the three-ball-and-vee coupling referenced above. The bearing interface of the coupling ideally occurs along three line contacts depicted by three equally spaced centerlines, as illustrated in FIG. 1, which shows a lower half of a coupling, generally indicated at 10, having a body or member 11 on which three teeth, teeth-like members, or raised sections 12, 13, and 14 are located and between which are spaces 15, 16, and 17. Each of the teeth includes tapered side sections 18 and 19, vertical side sections 20 and 21, and a top surface 22, 23 and 24. Three equally spaced centerlines 25, 26 and 27 extend through body 11 along the tapered surfaces 18 and 19, which as pointed out above and described in greater detail hereinafter constitute three line contacts. Body or member 11 is provided with a relieved center portion or opening 28. The opening 28 need not extend through the body 11, but the teeth cannot extend all the way to center. The advantage of contact length diminishes closer to center.

Figure 2:
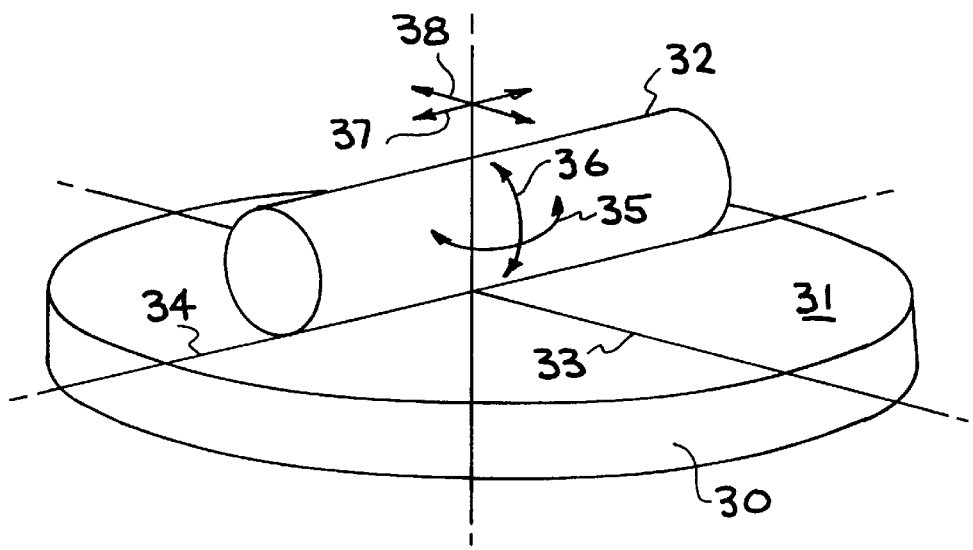
FIG. 2 illustrates four degrees of freedom of a cylinder on a plane.

A cylinder resting on a plane forms theoretical line contact and constrains exactly two degrees of freedom. The cylinder is free to slide in any of four degrees of freedom while maintaining line contact, as shown in FIG. 2 wherein a member 30 forming a plane 31 has a cylinder 32 mounted thereon, with centerlines being indicated at 33 and 34, and with movement of the cylinder 32 in any of four degrees of freedom while maintaining line contact being illustrated by double arrows 35, 36, 37 and 38. In practice, a cylinder 32 loaded on a flat or plane 31 provides sufficient bearing area and adequately approximates line contact.

The geometry, as illustrated in FIGS. 1 and 2, requires one coupling half to have cylindrical (curved) teeth surfaces and the other coupling half to have flat teeth surfaces, shown hereinafter with respect to the embodiment of FIGS. 3 and 4. Precision surface profiles, over the local areas of contact are inexpensive to manufacture using a surface grinder, whether the teeth surfaces are flat or curved (cylindrical). The relieved center portion 28 of the coupling member or half 11 does not effect the kinematics, but in the limit as the face width approaches zero, three line contacts become six point contacts. As a result of having line contact, instead of point contact, a three tooth coupling has greater load capacity and stiffness. An analogy is drawn from rolling element bearings where it is well known that roller bearings are superior in these regards to ball bearings of the same general size.

Figure 3:
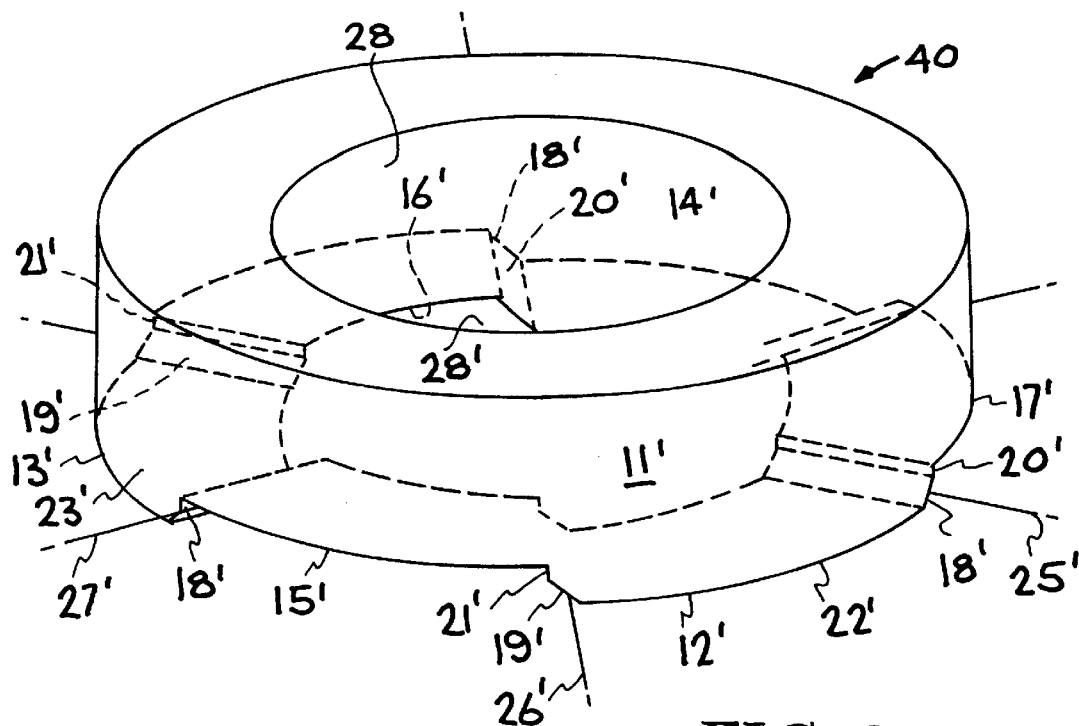
FIGS. 3 and 4 illustrate a preferred embodiment of upper and lower mating three tooth coupling halves made in accordance with the invention.
Figure 4:
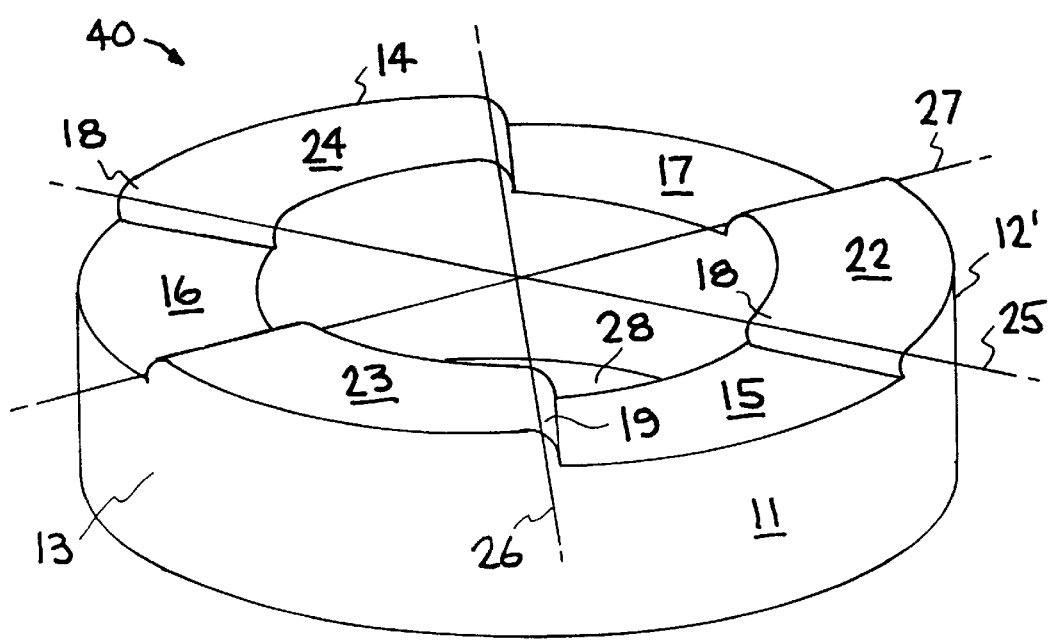

Referring now to FIGS. 3 and 4, which illustrate a preferred embodiment of a three tooth kinematic coupling, FIG. 3 illustrates the upper coupling half and FIG. 4 illustrates the lower coupling half. The upper coupling half is essentially an inverted duplicate of the lower coupling half except for the configuration of the teeth surfaces, the surfaces of the lower coupling half having a curvature while the surfaces of the upper coupling half are flat. The upper coupling half is rotated so that the teeth or teeth-like members thereof contact the spaces of the lower coupling half. Corresponding reference numbers to those of FIG. 1 are utilized for comparative purposes.

The lower coupling half of FIG. 4 is generally indicated at 40 while the upper coupling half of FIG. 3 is generally indicated at 40'. Each coupling half 40 and 40' have a body 11 and 11' on which teeth 12–12', 13–13' and 14–14' are located and separated by spaces 15–15', 16–16' and 17–17', with each tooth having tapered side sections 18–18' and 19–19', side sections 20–20' and 21–21', being vertical, sloped, or radiused (curved), and a top (upper) or bottom (lower) surface 22–22', 23–23', and 24–24'. The side sections 20–20' and 21–21' provide clearance and therefore could be of about any configuration. Three equally spaced centerlines 25–25', 26–26' and 27–27' extend through bodies 11–11' along the tapered surfaces 18–18' and 19–19', which indicate the only areas that contact between upper and lower coupling halves, as pointed out above. Bodies 11–11' include a relieved center portion or opening 28–28'. The contacting surfaces of the lower coupling (surfaces 18 and 19) are convex cylindrical surfaces with an axis parallel to centerlines 25, 26, 27. The contacting surfaces 18 and 19 of the upper coupling are preferably flat, although identical convex cylindrical surfaces could also be used.

By way of example, the curvature of the surfaces 18, 19 of teeth 12–14 has a radius of ½R to 2R with a preferred radius of R, where R is the outer radius of body 11. The tapered side sections 18–18' and 19–19' have a height of ¹⁄₂₀R to ¹⁄₁₀R with a taper of 45° to 60°, with a preferred taper of 45° and height of ¹⁄₁₅R. The vertical side sections 20–20' and 21–21° have an arbitrary height. The coupling halves may be constructed of hardened steel, cast iron, stainless steel, or structured ceramic, preferably ceramic for maximum duriability. The centerlines 25, 26, and 27 are equally spaced in angle (120°).

Any type of coupling requires a repeatable clamping force to hold its two halves in contact with each other. The method of applying a clamping force to the coupling halves can range from very simple such as gravity loading to more complex automated clamping mechanism. While a particular clamping mechanism for the embodiment of FIGS. 3 and 4 is not shown, such are known and within the skill of the art.

The three tooth kinematic coupling would be valuable whenever severe duty applications require repeatable location. Several applications are found in the machine tool industry, such as a tool holder for a high speed milling spindle because the three tooth coupling naturally accommodates differential radial expansion that may result due to temperatures or centrifugal affects. Another application is in a pallet exchange mechanism for machining centers.

The coupling halves may be constructed of the same material or each half may be constructed of different material for reasons such as better bearing properties (lower friction, better wear) or lower cost (suppose one coupling on a spindle mates with any number of tools).

It has thus been shown that the present invention provides an improved kinematic coupling which increases the actual area of contact, reduces localized stress points, and increases stiffness and load capacity. Thus, the use of three line contacts provides increased stiffness and load capacity over the prior known six point contact couplings.

While a particular embodiment of the invention has been illustrated, and particular materials and parameters have been set forth to exemplify the invention, such are not intended to be limiting. Modifications and changes may become apparent to those skilled in the art, and it is intended that the invention be limited only by the scope of the appended claims.

What is claimed is:

1. A kinematic coupling, consisting of;
   a pair of coupling halves having a bearing interface along three equally spaced lines of contact,
   said three lines of contact extending along three equally spaced centerlines through a common centerline of said coupling halves.
   each of said coupling halves having three equally spaced teeth,
   said teeth of one of said coupling halves cooperating with spaces between said spaced teeth of another of said coupling halves, and
   each of said three lines of contact pass along a surface on two of said three teeth.

2. The kinematic coupling of claim 1, wherein said teeth of one of said coupling halves have a curved surface.

3. The kinematic coupling of claim 1, wherein said teeth of the another of said coupling halves have a flat surface.

4. The kinematic coupling of claim 1, wherein each of said teeth of each of said coupling halves includes a tapered section on each side of each of said teeth.

5. The kinematic coupling of claim 4, wherein each of said teeth of each of said coupling halves includes a vertical section adjacent each of said tapered sections, said section being selected from the group of sections consisting of vertical, sloped, and curved.

6. The kinematic coupling of claim 1, wherein each of said coupling halves includes a relieved center portion.

7. In a kinematic coupling, the improvement comprising:
   said coupling consisting of a pair of coupling halves, each of said coupling halves being constructed to provide three equally spaced lines of contact,
   each of said pair of coupling halves being provided with three equally spaced teeth,
   said three lines of contact extending along three equally spaced centerlines of said coupling halves and
   each of said three lines of contact passing along a surface on two of said three spaced teeth.

8. The improvement of claim 7, wherein said three teeth on one of said pair of coupling halves each has a curved surface, and wherein said three teeth on another of said pair of coupling halves each has a flat surface, and wherein said teeth of one of said pair of coupling halves are adapted to cooperate with teeth of another of said pair of coupling halves.

9. The improvement of claim 8, wherein each of said teeth include a pair of tapering sections.

10. The improvement of claim 9, wherein each of said coupling halves includes a relieved center portion.

11. The improvement of claim 10, wherein one of said coupling halves is constructed to include curved surfaces on the teeth, and wherein another of said coupling halves is constructed to include flat surfaces on the teeth.

12. The improvement of claim 11, wherein said coupling halves are constructed from material selected from the group consisting of hardened steel, cast iron, stainless steel, and structural ceramic.

13. The improvement of claim 12, wherein said coupling halves are each constructed of the same material.

14. The improvement of claim 12, wherein said coupling halves are each constructed of a different material.

15. The improvement of claim 12, wherein each coupling half is composed of a monolithic unit, wherein the fit between teeth depends on the straightness along the contacting surfaces.

* * * * *

UNITED STATES PATENT AND TRADEMARK OFFICE
CERTIFICATE OF CORRECTION

PATENT NO. : 6,065,898
DATED : May 23, 2000
INVENTOR(S) : Hale

Page 1 of 1

It is certified that error appears in the above-identified patent and that said Letters Patent is hereby corrected as shown below:

<u>Title page,</u>
[*] delete "634" and insert -- 0 --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*